Patented May 26, 1936

2,042,314

UNITED STATES PATENT OFFICE 2,042,314

METHOD OF TREATING PARTIAL OXIDATION PRODUCTS

Joseph Hidy James, Pittsburgh, Pa., assignor to Clarence P. Byrnes, Sewickley, Pa., trustee No Drawing. Application October 13, 1934, Serial No. 748,213

8 Claims. (Cl. 260—156)

In the partial oxidation of hydrocarbons in the vapor or gaseous phase, formaldehyde is produced as well as methanol and usually acetaldehyde, acetone and some other alcohols. The exit stream also contains hydrogen in considerable quantities.

In the partial oxidation of hydrocarbon gases (hydrocarbons which are gaseous at normal temperatures and pressures), the formaldehyde is condensed as a weak solution, and considerable expense and loss are incurred in concentrating it to the commercial strength or concentration. This will be true of the partial oxidation processes set forth in my patents, No. 1,588,836 of June 15, 1926; No. 1,675,029 of June 26, 1928; No. 1,858,095 of May 10, 1932; Reissue No. 18,522 of July 12, 1932 and No. 1,941,010 of December 26, 1933.

Likewise in the vapor phase partial oxidation of petroleum fractions, considerable formaldehyde is formed and appears in the water layer in the condenser, due probably to breakdown of higher hydrocarbons or hydrocarbon derivatives. In this case again, hydrogen appears in the exit stream; and in both cases, the hydrogen is probably a product of the breaking down of oxygen derivatives formed in the partial oxidation process.

In the partial oxidation of natural gas or propane-butane mixtures, if 1,000 cubic feet of gas are mixed with approximately 15% by volume of air under a pressure of about 300 pounds per square inch and the mixture then passed through a reaction zone maintained at about 440° C. and over a catalyst such as set forth in the above patents with a time of sojourn of about three seconds on the catalyst, there results about eight gallons of liquid having usually about the following composition:

| | Percent |
|---|---|
| Methanol | by volume.. 30 |
| Formaldehyde (water solution) | by weight.. 27 |
| Acetaldehyde | by volume.. 6 |
| Acetone | by weight.. 3 |
| Ethyl alcohol, isopropyl alcohol and two isomeric butyl alcohols | by weight.. 4 |

The remainder is water holding the above bodies in solution.

When the above mixture leaves the reaction zone, all substances are present as gases or vapors under the prevailing temperature and pressure. The gas-vapor stream contains a considerable amount of decomposition products from the thermal decomposition of some of the oxidation products formed. These gaseous decomposition products are mainly oxides of carbon and hydrogen. The hydrogen is usually present in about three times the molecular concentration of the formaldehyde.

Methanol can be readily separated from complex mixtures by distillation. Hence, I propose to convert at least a material portion, and preferably the bulk of the formaldehyde, into methanol by means of the hydrogen in the exit stream and addition of further hydrogen, if desirable.

In extended experimenting in this direction, I have discovered that I can carry out this additional reaction to a very decided extent, by suitably reducing the temperature and pressure of the exit stream from the reaction zone to within certain ranges, passing this stream, with or without additional hydrogen, in contact with a nickel or other hydrogenating catalyst at the lower temperatures and pressures.

High pressure tends to produce condensation of the water produced in the process or fed in with the mixture, as is sometimes desirable; and this would carry out formaldehyde with it so that I avoid water condensation as far as possible by reducing the pressure. Also, I find that this reaction with the nickel hydrogenation catalyst should be carried out below a temperature of about 140° C. and preferably between 80° C. and 125° C. and especially between 100° C. to 110° C. or 115° C.

I wish to include other hydrogenating catalysts and be governed in the temperatures used by the decomposition point of formaldehyde in contact with the particular catalyst used. This assumes that such hydrogenating catalysts be selected which have the property of decomposing formaldehyde at a lower temperature than methanol, such as the oxides of the low-atomic-volume high-atomic-weight metals, molybdenum, vanadium, tungsten, etc.

The pressure should also be materially reduced before or when passing the exit stream through the nickel catalyst and sufficiently to prevent any material condensation of the water. For example, a nickel tube of 1¾ inch inside diameter and 30 inches long at the mid-section was provided with a 200 cc. volume filled with nickelized asbestos (18 grams nickel on 100 grams asbestos). This tube having closed ends with means for feeding fluids therethrough was immersed in an oil bath provided with a circulating device.

Now, if a partial oxidation process of the type of my patents above referred to is applied to natural gas or propane-butane mixture or similar mixture of gases under, say, 300 pounds pressure and at a temperature of about 440° C. and a time of sojourn of about two seconds, the exit stream would contain proportionately about 30 grams of formaldehyde, 14 grams of methanol and 56 grams of water.

When this exit gas-vapor stream mixture was passed through the hydrogenation step in the apparatus above described after being reduced in pressure to about 15 pounds gauge (two atmospheres), the liquid recovered contained proportionately about 16 grams of formaldehyde, 30 grams of methanol and 54 grams of water. This shows that the conversion of formaldehyde to methanol was almost completely in accord with theory, since 30 parts formaldehyde by weight would theoretically give on reduction about 32 parts of methanol.

Again, if the partial oxidation process on a gas or gas mixture is carried out to produce per hour under 300 pounds pressure and at about 440° C. a mixture of about 27 grams formaldehyde, 33 grams of methanol and 40 grams of water, and the pressure is reduced to about 17 pounds and the temperature to between 110° and 115° C. in the hydrogenating catalyst chamber, there is condensed and recovered about 5 grams of formaldehyde, 46 grams of methanol and 40 grams of water. The formaldehyde and methanol amount to about 51 grams, leaving about 9 grams of formaldehyde going to compounds which are probably of the "acetal" type which decomposed in the catalyst to form gaseous products. Since water hinders the formation of "acetal" bodies, it will be advisable in some cases to increase the water content of the mixture, as by adding steam, whether further hydrogen is added to the mixture or not beyond that naturally formed in the partial oxidation process. In this case, about 60% of the formaldehyde undergoing change was converted to methanol.

It is advisable to provide a large excess of hydrogen to increase the reaction in reducing the formaldehyde to methanol on account of the mass action law. Hence, it is advisable to add further hydrogen depending on questions of commercial economy.

The methanol may be recovered from the finally condensed product by proper fractional distillation. Where sulphur compounds are present in the natural gas or gas mixture treated, I prefer to remove the sulphur compounds before the gas enters the partial oxidation chamber.

The advantages of my invention result from the obtaining of a cheap and simple method of reducing the formaldehyde to methanol, thus doing away with the large expense and losses incurred in purifying and concentrating a weak formaldehyde mixture.

Any desirable pressures may be used, but preferably a high pressure of several atmospheres or several hundred or several thousand pounds may be used in the partial oxidation process; and after the partial oxidation step this pressure should be reduced to one which will not cause material condensation of the water before the hydrogenation step; this depending on the particular mixture present in the exit stream. The temperature should also be reduced depending in extent on the particular mixture; the temperature in the hydrogenation step may be such as will cause some decomposition within commercial limits; other hydrogenating catalysts may be used than nickel; the apparatus may be widely varied, and other changes may be made without departing from my invention.

I claim:

1. In the partial oxidation of hydrocarbons, the steps consisting of partially oxidizing hydrocarbon gases at a relatively higher temperature and pressure, reducing the pressure on the exit stream, reducing its temperature to below 140° C., and passing the same over a hydrogenating catalyst to convert formaldehyde into methanol.

2. In the partial oxidation of hydrocarbons, the steps consisting of partially oxidizing hydrocarbon gases at a relatively higher temperature and pressure, reducing the pressure on the exit stream to a pressure at which substantial condensation of water is prevented, reducing its temperature to below 140° C., and passing the same over a hydrogenating catalyst to convert formaldehyde into methanol.

3. In the partial oxidation of hydrocarbons, the steps consisting of partially oxidizing hydrocarbon gases at a relatively higher temperature and pressure, reducing the pressure on the exit stream, reducing its temperature to from 80° to 140° C., and passing the same over a hydrogenating catalyst to convert formaldehyde into methanol.

4. In the partial oxidation of hydrocarbons, the steps consisting of partially oxidizing hydrocarbon gases at a relatively higher temperature and pressure, reducing the pressure on the exit stream, reducing its temperature to less than 115° C., and passing the same over a hydrogenating catalyst to convert formaldehyde into methanol.

5. In the partial oxidation of hydrocarbons, the steps consisting of partially oxidizing hydrocarbon gases at a relatively higher temperature and pressure, reducing the pressure on the exit stream to less than three atmospheres, reducing its temperature to below 140° C., and passing the same over a hydrogenating catalyst to convert formaldehyde into methanol.

6. In the partial oxidation of hydrocarbons, the steps consisting of partially oxidizing hydrocarbon gases at a relatively higher temperature and pressure, reducing the pressure on the exit stream, reducing its temperature to below 140° C., and then passing the exit stream over a metal hydrogenating catalyst.

7. In the partial oxidation of hydrocarbons, the steps consisting of partially oxidizing hydrocarbon gases at a relatively higher temperature and pressure, reducing the pressure on the exit stream, reducing its temperature to below 140° C., adding hydrogen to the stream, and passing the exit stream over a hydrogenating catalyst.

8. The process consisting of partially oxidizing hydrocarbon gases at a relatively higher temperature to produce an exit stream containing formaldehyde in the vapor phase, adding hydrogen to said vapor stream and reducing the temperature, and passing said stream over a hydrogenating catalyst.

JOSEPH HIDY JAMES.